United States Patent
Fujii

(10) Patent No.: US 10,302,825 B2
(45) Date of Patent: May 28, 2019

(54) REFLECTIVE MEMBER AND SURFACE LIGHT SOURCE DEVICE HAVING SAID REFLECTIVE MEMBER

(71) Applicant: Enplas Corporation, Saitama (JP)

(72) Inventor: Yuki Fujii, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/526,589

(22) PCT Filed: Oct. 29, 2015

(86) PCT No.: PCT/JP2015/080593
§ 371 (c)(1),
(2) Date: May 12, 2017

(87) PCT Pub. No.: WO2016/076134
PCT Pub. Date: May 19, 2016

(65) Prior Publication Data
US 2017/0322352 A1 Nov. 9, 2017

(30) Foreign Application Priority Data

Nov. 14, 2014 (JP) .................................. 2014-231740
Nov. 27, 2014 (JP) .................................. 2014-239713

(51) Int. Cl.
*F21K 9/68* (2016.01)
*F21S 8/00* (2006.01)
(Continued)

(52) U.S. Cl.
CPC .................. *G02B 5/10* (2013.01); *F21K 9/68* (2016.08); *F21V 7/048* (2013.01); *F21V 7/05* (2013.01);
(Continued)

(58) Field of Classification Search
CPC ....... G02F 1/133605; F21V 7/048; F21V 7/05
See application file for complete search history.

(56) References Cited

U.S. PATENT DOCUMENTS

| | | | | | |
|---|---|---|---|---|---|
| 2,242,590 | A | * | 5/1941 | Moreau | ..................... F21V 7/05 362/341 |
| 3,701,898 | A | * | 10/1972 | McNamara, Jr. | ......... F21V 7/05 362/341 |
| 7,178,951 | B1 | * | 2/2007 | Hsiao | ................ G02F 1/133611 362/362 |

(Continued)

FOREIGN PATENT DOCUMENTS

| JP | 2006-059606 A | 3/2006 |
|---|---|---|
| JP | 2013-143240 A | 7/2013 |

(Continued)

OTHER PUBLICATIONS

International Search Report from International Application No. PCT/JP2015/080593 dated Jan. 12, 2016.

*Primary Examiner* — Alexander K Garlen
(74) *Attorney, Agent, or Firm* — Brundidge & Stanger, P.C.

(57) ABSTRACT

This reflective member comprises a rectangular bottom surface, four inclined planes joined to the four edges of the bottom surface and whereof each is inclined with respect to the bottom surface so as to slope up from the bottom surface, and four planar corner portion inclined planes, whereof each is disposed in such a manner as to link two adjacent inclined planes.

5 Claims, 13 Drawing Sheets

(51) Int. Cl.
*F21V 7/04* (2006.01)
*F21V 7/05* (2006.01)
*G02B 5/10* (2006.01)
*F21V 13/12* (2006.01)
*G02F 1/1335* (2006.01)

(52) U.S. Cl.
CPC ........ *F21V 13/12* (2013.01); *G02F 1/133605* (2013.01); *F21S 8/00* (2013.01)

(56) References Cited

U.S. PATENT DOCUMENTS

| | | |
|---|---|---|
| 2007/0121320 A1 | 5/2007 | Arai et al. |
| 2007/0230206 A1 | 10/2007 | Hsiao et al. |
| 2012/0099028 A1 | 4/2012 | Yokota |
| 2014/0368768 A1 | 12/2014 | Sakai |
| 2015/0055059 A1* | 2/2015 | Suzuki .............. G02F 1/133603 349/67 |
| 2015/0226400 A1* | 8/2015 | Wada ................ G02F 1/133611 362/97.1 |
| 2015/0261043 A1* | 9/2015 | Lee .................. G02F 1/133308 349/58 |
| 2015/0285442 A1* | 10/2015 | Smith ..................... F21V 13/04 362/309 |
| 2015/0309366 A1* | 10/2015 | Park .................. G02F 1/133605 349/58 |

FOREIGN PATENT DOCUMENTS

| | | |
|---|---|---|
| WO | 2010/146921 A1 | 12/2010 |
| WO | 2012/060313 A1 | 5/2012 |

\* cited by examiner

REFLECTIVE MEMBER AND SURFACE LIGHT SOURCE DEVICE HAVING SAID REFLECTIVE MEMBER

TECHNICAL FIELD

The present invention relates to a reflection member and a surface light source device including the reflection member.

BACKGROUND ART

Some transmission type image display apparatuses such as liquid crystal display apparatuses use a direct surface light source device as a backlight. In recent years, direct surface light source devices having a plurality of light emitting elements as the light source have been used (see, for example, PTL 1).

FIG. 1 is a plan view of surface light source device 10 disclosed in PTL 1. As illustrated in FIG. 1, surface light source device 10 disclosed in PTL 1 includes a plurality of LEDs (light emitting elements) 12, a plurality of LED substrates 14 on which the plurality of LEDs 12 are disposed, reflection sheet 16 disposed on LED substrates 14 and including a plurality of openings disposed at positions corresponding to positions of the plurality of LEDs, and backlight chassis 18 configured to house the above-mentioned parts. The edge of reflection sheet 16 is obliquely raised with respect to the bottom plate. In surface light source device 10 disclosed in PTL 1, light emitted from LED 12 and reached reflection sheet 16 is reflected, and it is thus possible to illuminate a region around an illumination region without providing LED 12 at a peripheral portion of reflection sheet 16. However, in surface light source device 10 disclosed in PTL 1, disadvantageously, a part immediately above LED 12 (a center portion of the illumination region) is bright, but the brightness at four corners of the illumination region is insufficient.

To solve this problem, techniques of adjusting the orientations of LEDs, diffusion lenses and the like have been proposed (see, for example, PTL 2). PTL 2 discloses a surface light source device including: a plurality of LEDs (light emitting elements), a plurality of diffusion lenses configured to control a distribution of light emitted from the LEDs, a plurality of LED substrates on which the plurality of LEDs and the plurality of diffusion lenses are disposed, a reflection sheet disposed on the LED substrates and including a plurality of openings disposed at positions corresponding to the positions of the plurality of LEDs and the plurality of diffusion lenses, a diffusion plate and an optical sheet disposed with an air layer interposed with the diffusion lenses, and a backlight chassis configured to house the above-mentioned parts. The plurality of diffusion lenses and the plurality of LEDs disposed on the outside are formed such that the optical axis of the LED and the central axis of the emission surface of the diffusion lens are oriented to the external edge of the diffusion plate and the optical sheet. In the surface light source device disclosed in PTL 2, the optical axis of the LED disposed at the center and the central axis of the emission surface of the diffusion lens are oriented to the center portion of the illumination region (immediate upper part), and the central axis of the emission surface of the diffusion lens and the optical axis of the LED disposed on the outside are oriented toward the external edge of the illumination region, and, it is thus possible to uniformly illuminate the illumination region.

CITATION LIST

Patent Literature

PTL 1
WO2010/146921
PTL 2
Japanese Patent Application Laid-Open No. 2013-143240

SUMMARY OF INVENTION

Technical Problem

However, in the surface light source device disclosed in PTL 2, the shapes of the LEDs and the diffusion lenses are different from each other, and the number of the types of the components are large. Consequently, with the surface light source device disclosed in PTL 2, the manufacturing cost is disadvantageously increased, and the manufacturing process is disadvantageously complicated.

In view of this, an object of the present invention is to provide a reflection member and a surface light source device including the reflection member which can reflect light to uniformly illuminate an illumination region even with a surface light source device provided with light emitting elements of one type and light flux controlling members of one type.

Solution to Problem

A reflection member of an embodiment of the present invention includes: a rectangular bottom surface; four tilted surfaces connected with four sides of the bottom surface and tilted to the bottom surface such that the four tilted surfaces are raised from the bottom surface; and four tilted corner surfaces, each of the four tilted corner surfaces having a planar shape and being disposed to connect adjacent two tilted surfaces of the four tilted surfaces.

A surface light source device of an embodiment of the present invention includes: the reflection member; one or more light emitting elements disposed above a plane including the bottom surface of the reflection member; one or more light flux controlling members respectively disposed over the one or more light emitting elements, and configured to control a light distribution of light emitted from the light emitting elements; and a light diffusion member disposed with an air layer interposed between the light flux controlling member and the light diffusion member, the light diffusion member being configured to allow light emitted from the light flux controlling member to pass therethrough while diffusing the light.

Advantageous Effects of Invention

According to the present invention, it is possible to uniformly illuminate an illumination region even with a surface light source device in which light emitting elements of one type and light flux controlling members of one type are disposed in one direction. Accordingly, a surface light source device which can uniformly illuminate an illumination region can be manufactured at a low cost.

DESCRIPTION OF EMBODIMENT

A surface light source device according to an embodiment of the present invention is described below in detail with reference to the accompanying drawings.

(Configuration of Surface Light Source Device)

Figure 1:
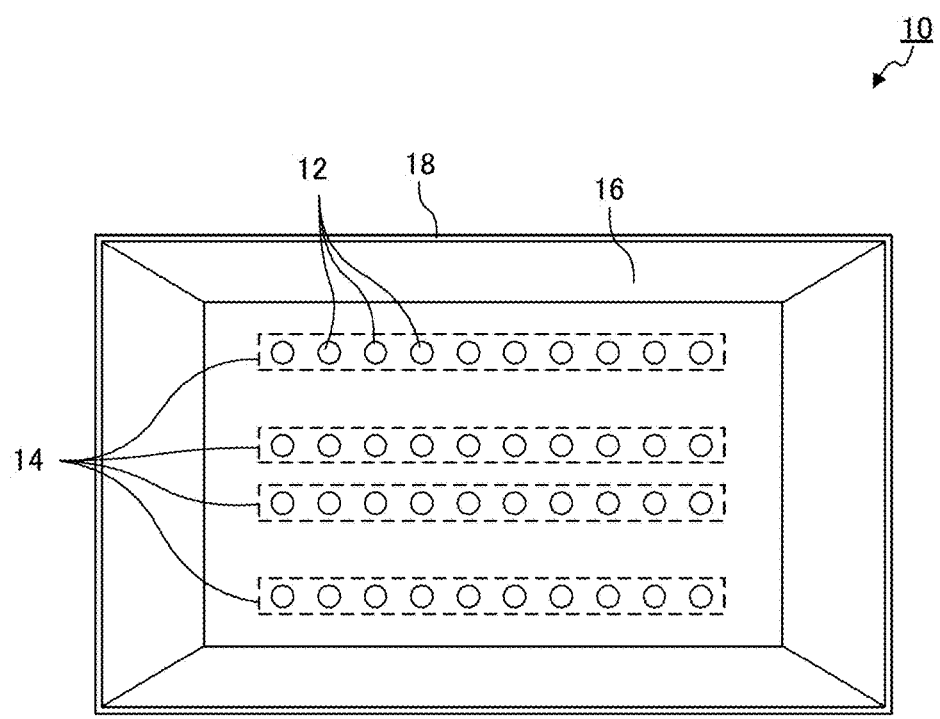
FIG. 1 is a plan view of a surface light source device disclosed in PTL 1.
Figure 2A:
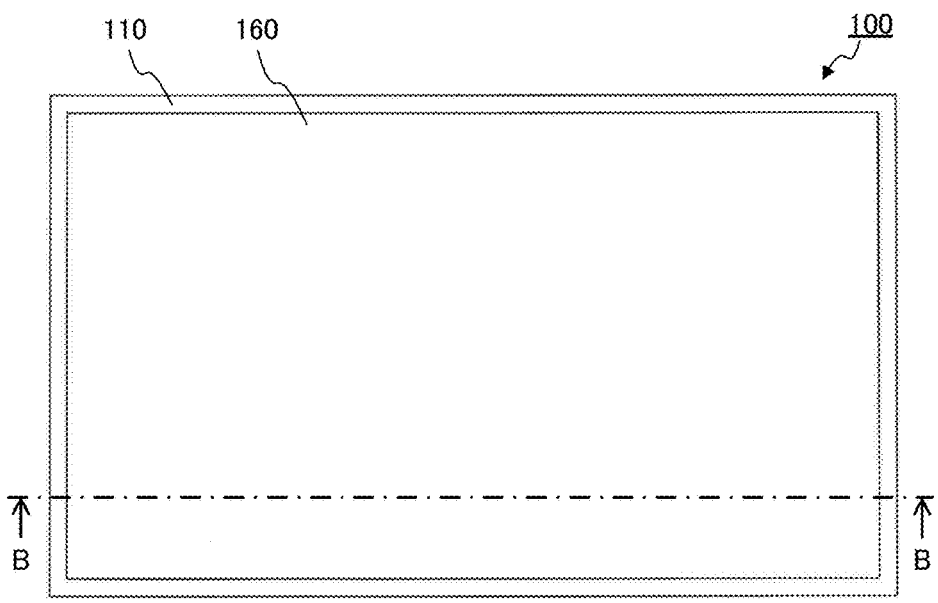
FIG. 2A and FIG. 2B illustrate a configuration of a surface light source device according to an embodiment of the present invention.
Figure 2B:
Figure 3A:
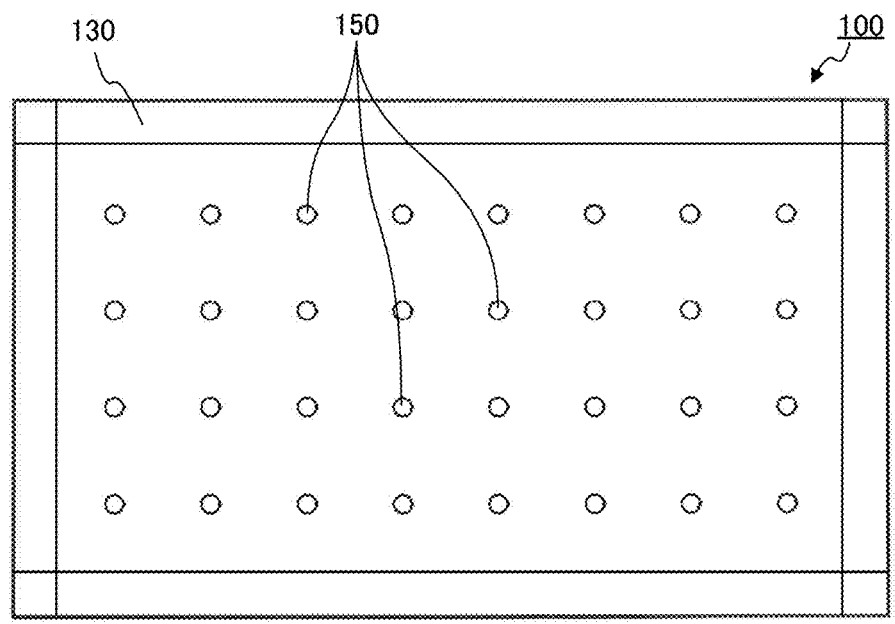
FIG. 3A to FIG. 3C illustrate a configuration of the surface light source device according to the embodiment of the present invention.
Figure 3B:
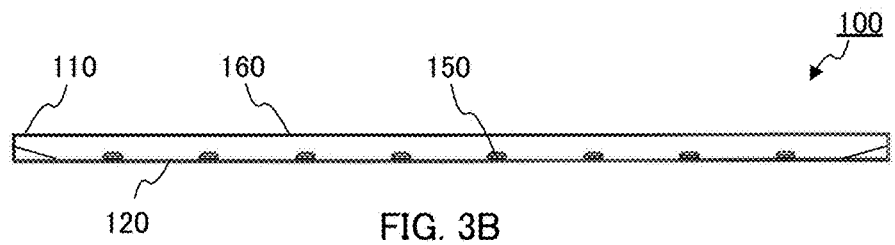
Figure 3C:
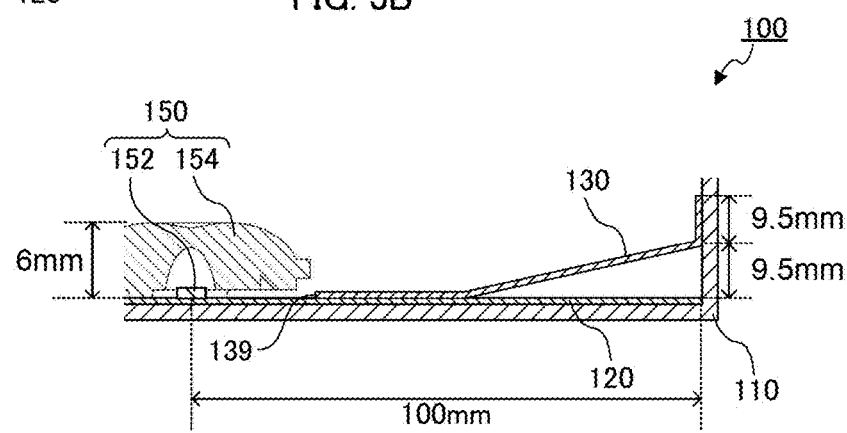

FIG. 2A to FIG. 3C illustrate a configuration of surface light source device 100 according to an embodiment of the present invention. FIG. 2A is a plan view of surface light source device 100, and FIG. 2B is a front view of surface light source device 100. FIG. 3A is a sectional view taken along line A-A of FIG. 2B, FIG. 3B is a sectional view taken along line B-B of FIG. 2A, and FIG. 3C is an enlarged view of FIG. 3B.

As illustrated in FIG. 2A to FIG. 3C, surface light source device 100 according to the present embodiment includes housing 110, substrate 120, reflection member 130, one or more light emitting devices 150 each including light emitting element 152 and light flux controlling member 154, and light diffusion member 160. Substrate 120 is disposed on the upper side of the bottom plate of housing 110, and reflection member 130 is disposed on the upper side of substrate 120. In addition, a plurality of through holes 139 are formed in regions corresponding to light emitting devices 150 in reflection member 130, and a plurality of light emitting devices 150 are disposed at a constant interval on substrate 120. The top plate of casing 110 is provided with an opening. Light diffusion member 160 is disposed over light emitting devices 150 to close the opening such that light diffusion member 160 is substantially parallel to substrate 120 and functions as a light emitting surface. The size of light emitting surface is, but not limited to, about 400 mm×about 700 mm, for example.

One or more light emitting devices 150 are fixed on substrate 120. In the present embodiment, a plurality of light emitting devices 150 are disposed on substrate 120. Light emitting device 150 includes light emitting element 152 and light flux controlling member 154. Light emitting element 152 and light flux controlling member 154 are fixed to substrate 120 through through hole 139.

Light emitting element 152 is a light source of surface light source device 100. Light emitting element 152 is a light emitting diode (LED) such as a white light emitting diode, for example. A plurality of light emitting elements 152 are formed in the same shape. Light emitting element 152 is disposed on substrate 120 at a position above a plane including bottom surface 132 of reflection member 130 (see FIG. 4A).

Light flux controlling member 154 is a lens that expands the distribution of light emitted from light emitting element 152. The shape of light flux controlling member 154 is not limited as long as light emitted from light emitting element 152 can be expanded. Light flux controlling member 154 is disposed over light emitting element 152 such that the central axis of light flux controlling member 154 coincides with the optical axis of light emitting element 152. In the present embodiment, the optical axis of light emitting element 152 and the central axis of light flux controlling member 154 are perpendicular to substrate 120. Here, the "the optical axis of the light emitting element" means a central light beam of a stereoscopic light flux from light emitting element 152. The optical axis of light emitting device 150 coincides with the optical axis of light emitting element 152 and the central axis of light flux controlling member 154. A gap for dissipating the heat emitted from light emitting element 152 to the outside is formed between substrate 120 and light flux controlling member 154. It is to be noted that shapes of a plurality of light flux controlling members 154 are identical to each other.

Light flux controlling member 154 is formed by integral shaping. The material of light flux controlling member 154 is not limited as long as light of a desired wavelength can pass therethrough. Examples of the material of light flux controlling member 154 include: light transmissive resins such as polymethylmethacrylate (PMMA), polycarbonate (PC), and epoxy resin (EP); and glass.

Reflection member 130 reflects a part of arrival light emitted from light emitting device 150 (light flux controlling member 154) toward light diffusion member 160. The material of reflection member 130 is not limited as long as light emitted from light emitting element 152 can be reflected. Examples of the material of reflection member 130 include foamed PET, acrylic resin, polycarbonate, ABS and the like. In the present embodiment, reflection member 130 has a rectangular shape in plan view as with the bottom plate of housing 110. Reflection member 130 may be composed of one continuous sheet member made of the above-mentioned material, or a plurality of sheet-like members made of the above-mentioned material. The shape of reflection member 130 will be described in detail later.

Light diffusion member 160 is a plate-shaped member having a light diffusing property, and allows the light emitted from light emitting device 150 to pass therethrough while diffusing the light. Normally, the size of light diffusion member 160 is substantially the same as that of the illumination member such as a liquid crystal panel. For example, light diffusion member 160 is formed of a light transmissive resin such as polymethylmethacrylate (PMMA), polycarbonate (PC), polystyrene (PS), and styrene methyl methacrylate copolymerization resin (MS). For the purpose of providing a light diffusing property, minute irregularities are formed on the surface of light diffusion member 160, or diffusing members such as beads are dispersed in light diffusion member 160.

Light emitted from light emitting element 152 is expanded in a radial direction (a direction away from the optical axis) by light flux controlling member 154. Light emitted from light emitting device 150 directly reaches light diffusion member 160 or reaches light diffusion member 160 by being reflected by reflection member 130. The light reaching light diffusion member 160 passes through light diffusion member 160 while being diffused. As a result, light diffusion member 160 (illumination region) is uniformly illuminated.

(Configuration of Reflection Member)

Figure 4A:
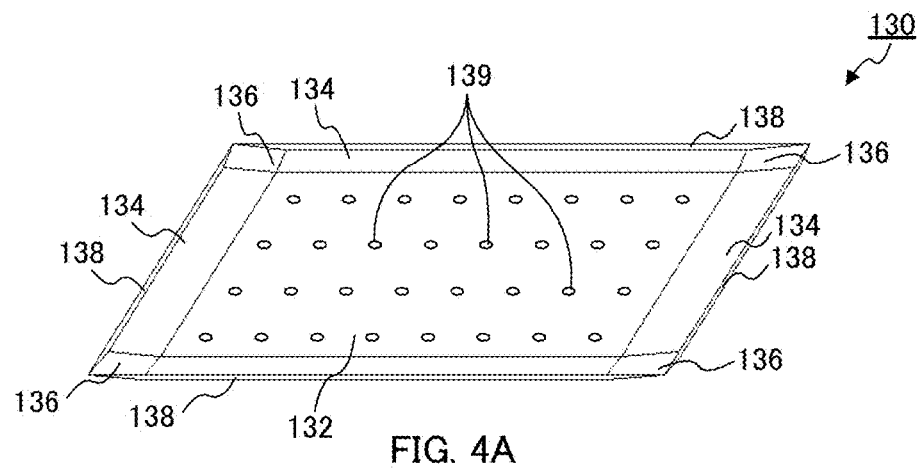
FIG. 4A to FIG. 4C illustrate a configuration of a reflection member.
Figure 4B:
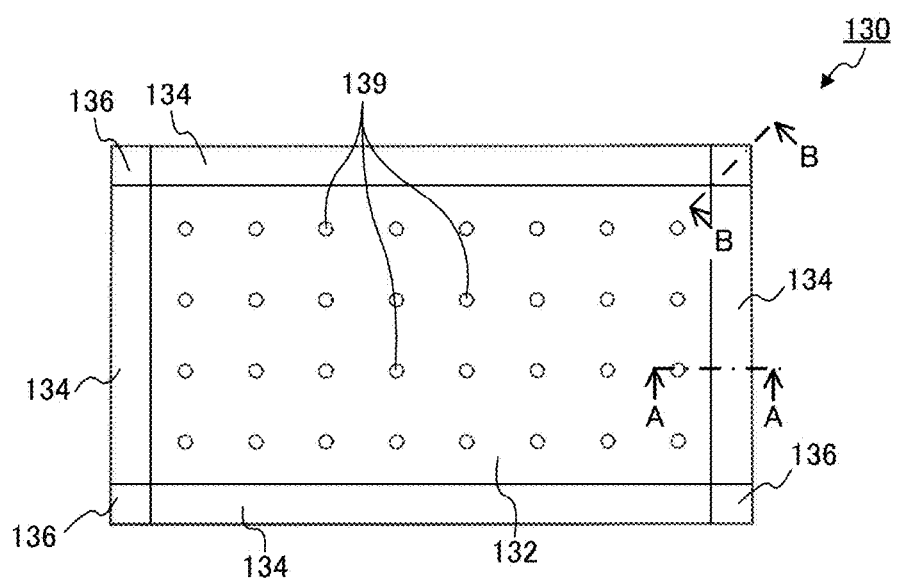
Figure 4C:
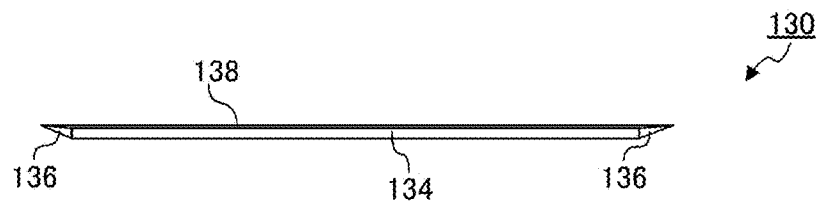
Figure 5A:
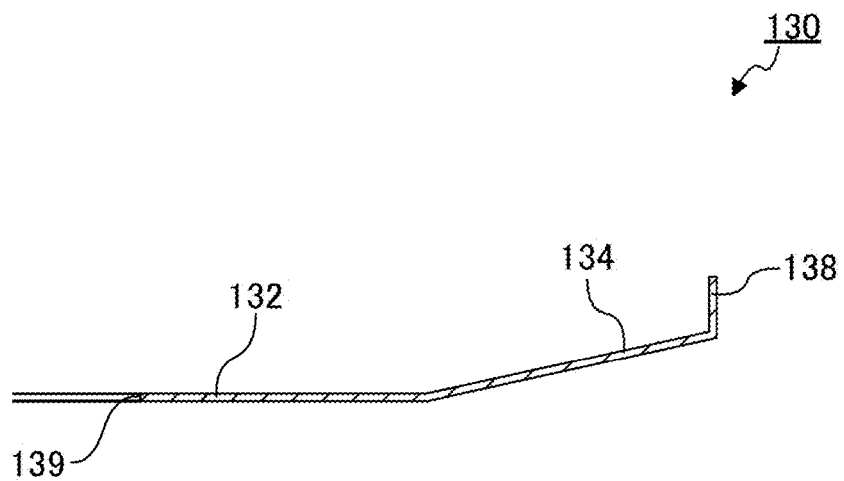
FIG. 5A and FIG. 5B are partially enlarged sectional views of the reflection member.
Figure 5B:
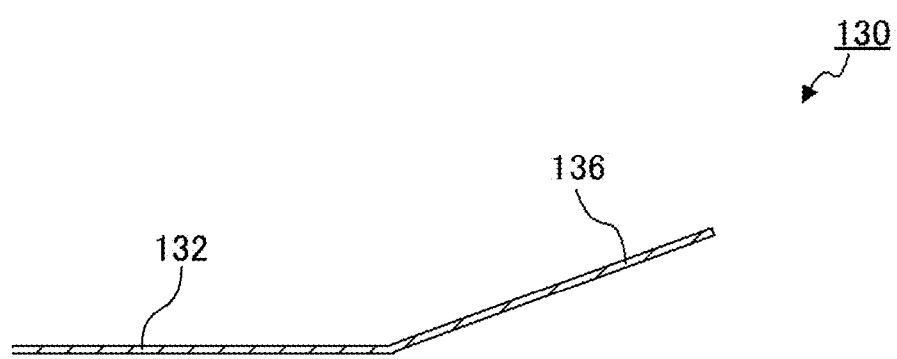
Figure 6:
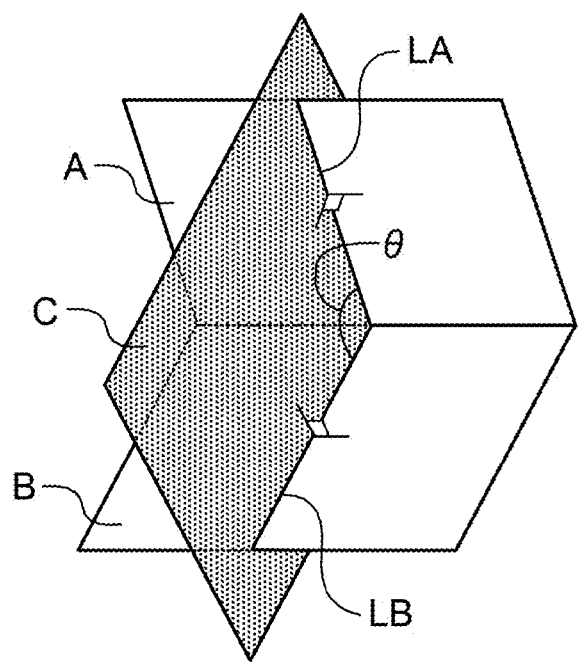
FIG. 6 is a drawing for describing a dihedral angle.

FIG. 4A to FIG. 5B illustrate a configuration of reflection member 130. FIG. 4A is a perspective view of reflection member 130, FIG. 4B is a plan view of reflection member 130, and FIG. 4C is a front view of reflection member 130. FIG. 5A is a partially enlarged sectional view taken along line A-A of FIG. 4B, and FIG. 5B is a partially enlarged sectional view taken along line B-B of FIG. 4B. In addition, FIG. 6 is a drawing for describing a dihedral angle.

As illustrated in FIG. 4A to FIG. 5B, reflection member 130 includes bottom surface 132, four tilted surfaces 134, four tilted corner surfaces 136, and four bonding surfaces 138. Bottom surface 132 is disposed on the upper side of substrate 120. Bottom surface 132 has a rectangular (square) shape in plan view. In addition, a plurality of through holes 139 are formed in bottom surface 132. The plurality of through holes 139 are formed at positions corresponding to light emitting devices 150. The number of through holes 139 is identical to that of light emitting devices 150. Through holes 139 are formed in bottom surface 132 of reflection member 130, and thus light emitting device 150 can be fixed to substrate 120 at a position on a plane including bottom surface 132 of reflection member 130. The size (diameter) of through hole 139 is not limited as long as light emitting device 150 can be directly fixed to substrate 120. In the present embodiment, the size (diameter) of through hole 139 is greater than the plan shape of light emitting device 150.

Each of four tilted surfaces 134 reflects a part of light, which is emitted from light emitting device 150 toward the internal surface of housing 110, toward an edge of light diffusion member 160. Four tilted surfaces 134 are respectively connected with the four sides of bottom surface 132. Each of four tilted surfaces 134 may have a planar shape, or a curved shape. In the present embodiment, each of four tilted surfaces 134 has a planar shape. In addition, four tilted surfaces 134 are tilted to bottom surface 132 such that four tilted surfaces 134 are raised from bottom surface 130. The dihedral angle between bottom surface 132 and tilted surface 134 is not limited. The dihedral angles between bottom surface 132 and tilted surface 134 may be identical to or different from each other. In the present embodiment, the dihedral angles between bottom surface 132 and tilted surface 134 are identical to each other. The dihedral angle between bottom surface 132 and tilted surface 134 is 15° or smaller in the present embodiment. When the dihedral angle between bottom surface 132 and tilted surface 134 falls outside a predetermined range, light reflected by tilted surface 134 cannot reach an edge of light diffusion member 160 in some situation.

Now, the dihedral angle is described. As illustrated in FIG. 6, the "dihedral angle" of the case where plane A and plane B are adjacent to each other is angle θ that is the smaller angle between intersection line LA and intersection line LB where plane C is a plane which is perpendicular to plane A and plane B, intersection line LA is an intersection line of plane A and plane C, and intersection line LB is an intersection line of plane B and plane C. When it is assumed that plane A is bottom surface 132 and that plane B is tilted surface 134, intersection line LA and intersection line LB are limited straight lines. One of the angles between two limited straight lines which make contact with each other at end portions is equal to or greater than 180°, and the other is smaller 180°. Accordingly, as described above, the "dihedral angle" is greater than 0° and smaller than 180°.

Returning to the description of tilted surface 134, the plan shape of reflection member 130 is identical to the shape of bottom plate of housing 110 as described above. That is, the plan shapes of four tilted surfaces 134, which are disposed to fill the region between the four sides of bottom surface 132 and the internal surfaces of housing 110 (except for a region corresponding to the tilted corner surface 136 described later) as viewed in plan view of surface light source device 100, are not limited. In the present embodiment, in four tilted surfaces 134, the shapes of two tilted surfaces 134 facing each other along the long side direction of bottom surface 132 are identical to each other, and the shapes of two tilted surfaces 134 facing each other along the short side direction of bottom surface 132 are identical to each other. To be more specific, each of the shapes of two tilted surfaces 134 facing each other along the long side direction of bottom surface 132 is a rectangular shape whose long side has a length identical to the length of the short side of bottom surface 132. In addition, each of the shapes of two tilted surfaces 134 facing each other along the short side direction of bottom surface 132 is a rectangular shape whose long side has a length identical to the length of the long side of bottom surface 132. In the present embodiment, the short side of two tilted surfaces 134 facing each other along the long side direction of bottom surface 132 and the short side of two tilted surfaces 134 facing each other in the short side direction of bottom surface 132 are identical to each other.

Each of four tilted corner surfaces 136 is formed in a planar shape, and reflects a part of light, which is emitted from light emitting element 152 toward four corners (corner portions formed by two internal surfaces) of housing 110, toward corner portions of light diffusion member 160. Four tilted corner surfaces 136 are disposed to connect respective adjacent two tilted surfaces 134. In addition, four tilted corner surfaces 136 are tilted to bottom surface 132. The dihedral angle between bottom surface 132 and tilted corner surface 136 is not limited. The dihedral angles between bottom surface 132 and tilted corner surface 136 may be identical to or different from each other. In the present embodiment, the dihedral angle between bottom surface 132 and tilted corner surface 136 are identical to each other. The dihedral angle between bottom surface 132 and tilted corner surface 136 is about 15° in the present embodiment. When the dihedral angle between bottom surface 132 and tilted surface 134 falls outside the above-described range, there is a possibility that light reflected by tilted corner surface 136 does not reach light a corner portion of diffusion member 160. The relationship between the dihedral angle between bottom surface 132 and tilted corner surface 136 and the dihedral angle between bottom surface 132 and tilted surface 134 is not limited. The dihedral angle between bottom surface 132 and tilted corner surface 136 may be greater than the dihedral angle between bottom surface 132 and tilted surface 134, and the dihedral angle between bottom surface 132 and tilted surface 134 may be greater than the dihedral angle between bottom surface 132 and tilted corner surface 136. In the present embodiment, the dihedral angle between bottom surface 132 and tilted corner surface 136 is greater than the dihedral angle between bottom surface 132 and tilted surface 134. It is to be noted that the dihedral angle between bottom surface 132 and tilted corner surface 136 differs depending on the dihedral angle between bottom surface 132 and tilted surface 134 and the like.

In addition, in plan view, each tilted corner surface 136 is disposed to fill a region surrounded by adjacent two tilted surfaces 134 and the extensions of the external sides of the adjacent two tilted surfaces 134 (a region surrounded by adjacent two tilted surfaces 134 and the internal surface of housing 110). In the present embodiment, the external shape of tilted corner surface 136 is, but not limited to, a rhombus. In addition, in side view of surface light source device 100, the distance between bottom surface 132 and the upper end portion of tilted corner surface 136 is greater than the distance between bottom surface 132 and the upper end portion of tilted surface 134. That is, the upper end portion of tilted corner surface 136 is located on light diffusion member 160 side relative to the upper end portion of tilted surface 134.

Four bonding surfaces 138 are connected with the upper end portions of tilted corner surface 136 and tilted surface 134. Bonding surfaces 138 are used when reflection member 130 is bonded to the internal surface of housing 110. The shape of bonding surface 138 is not limited. The shape of bonding surface 138 is appropriately set in accordance with the shapes of four tilted surfaces 134 and four tilted corner surfaces 136. Preferably, when reflection member 130 is disposed in housing 110, the upper end portion of bonding surface 138 and the upper end portion of internal surface of housing 110 are located at the same position. When the upper end portion of bonding surface 138 and the upper end portion of the internal surface of housing 110 are located at the same position, light emitted from light emitting device 150 can be efficiently reflected toward light diffusion member 160.

(Method of Manufacturing Reflection Member)

Figure 7:
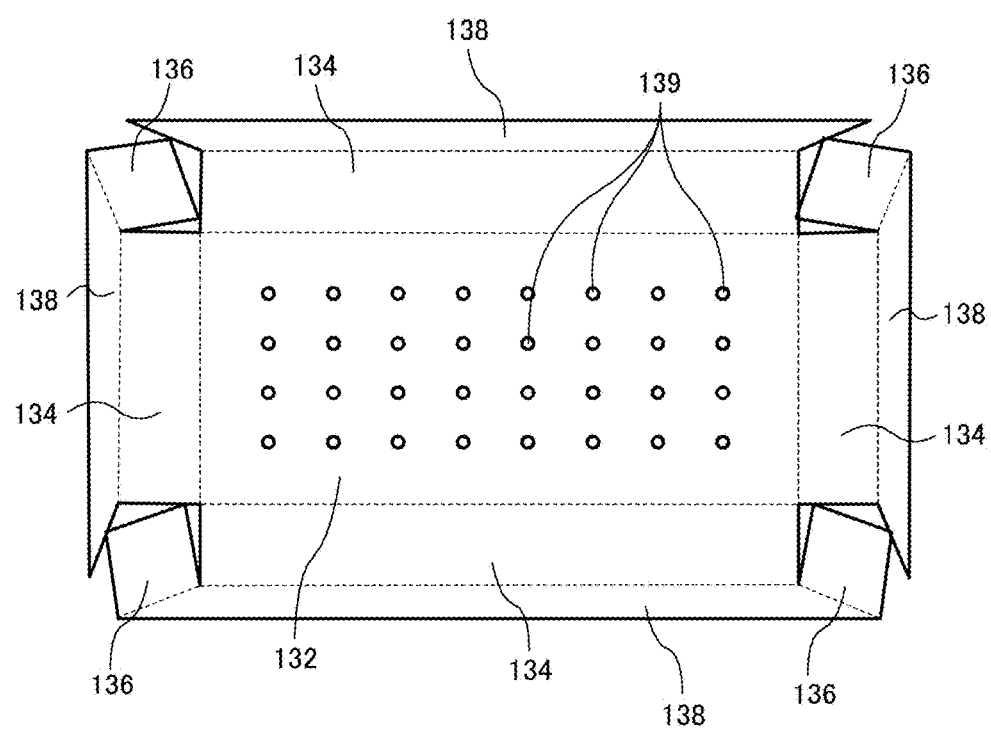
FIG. 7 is a development of the reflection member.

The method of manufacturing reflection member 130 is not limited as long as the above-described shape can be obtained. Reflection member 130 can be manufactured by the following method, for example. FIG. 7 is a development of reflection member 130. First, a sheet-like member which is easy to process and has a thickness of about 0.1 to 0.3 mm is created with use of the above-described material. Next, the sheet-like member is cut out along the solid line of FIG. 7, and a plurality of through holes 139 are formed at predetermined positions. The sheet-like member thus cut out is bent (only mountain fold or only valley fold) along the broken line of FIG. 7. Finally, the sheet-like member is fixed to reflection member 130. The method of fixing to reflection member 130 is not limited. For example, the fixation may be performed by heat fusing. In addition, a bonding portion for fixing to reflection member 130 may be provided in the development. In this case, the sheet-like member is cut out such that the sheet-like member includes the bonding portion. Then, an adhesive agent is applied to the bonding portion, and the sheet-like member cut out in the above-mentioned manner is fixed in the shape of reflection member 130. Alternatively, a reflection member shaped with a reflective material may be used in place of reflection member 130 of the sheet processed in the above-mentioned manner.

(Simulation)

A light path of light which is emitted from the center of the light emitting surface of light emitting element 152 disposed at a corner portion, and advances toward a corner portion of reflection member 130 according to the present embodiment was simulated. In addition, for comparison, a light path of light which is emitted from light emitting element 152 disposed at a corner portion, and advances toward a corner portion of reflection member 130' of a comparative example provided with no tilted corner surface 136 was simulated. In this simulation, in plan view of reflection members 130 and 130', light emitting element 152 was disposed at a position where the center of the light emitting surface is located at a position 100 mm from two edges of reflection member 130 to the center, 30 mm from two edges of bottom surface 132 to the center, and 0.55 mm from the bottom surface of reflection member 130 to light diffusion member 160. In addition, the angle of light which is emitted parallel to bottom surfaces 132 and 132' was set to 90°, and the angle of light which is emitted perpendicularly to bottom surfaces 132 and 132' was set to 0°. Further, the distance from bottom surface 132 to the rear surface of light diffusion member 160 was set to 19 mm.

Figure 8:
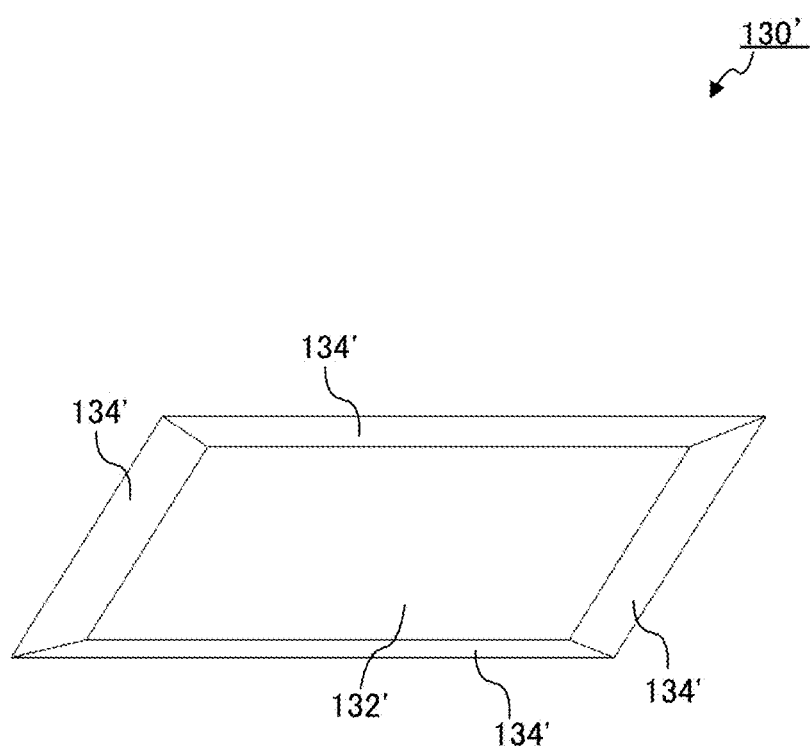
FIG. 8 is a perspective view of a reflection member according to a comparative example.
Figures 9A, 9B:
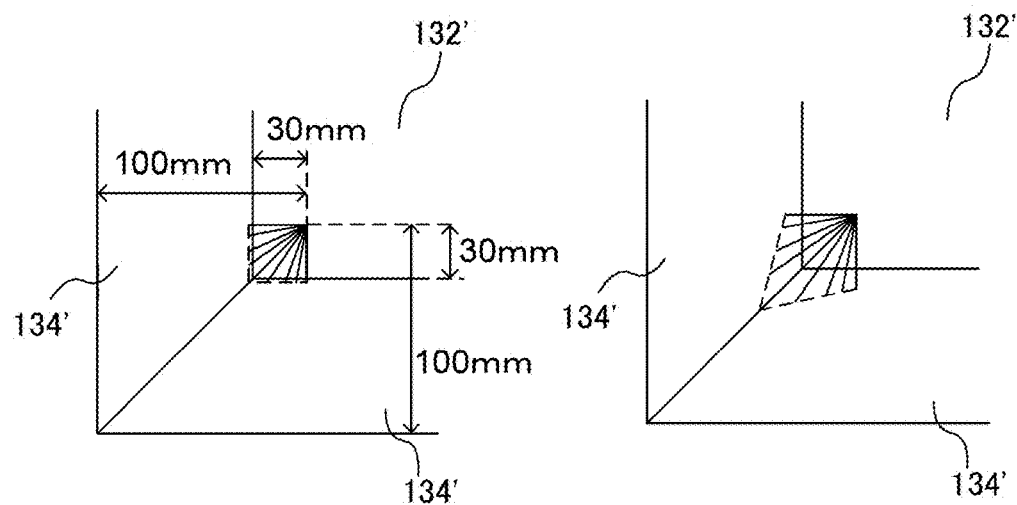
FIG. 9A to FIG. 9D illustrate light paths at a corner portion the reflection member according to the comparative example.
Figures 9C, 9D:
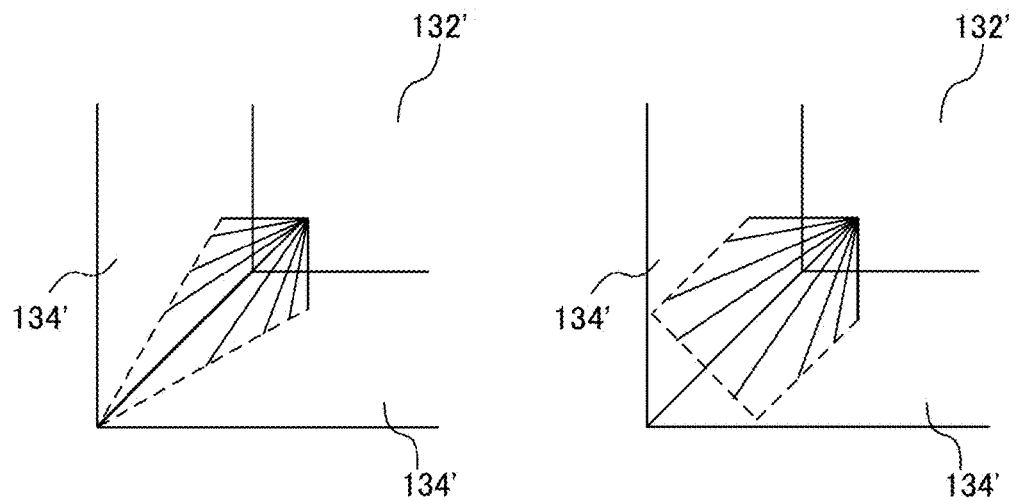
Figure 10A:
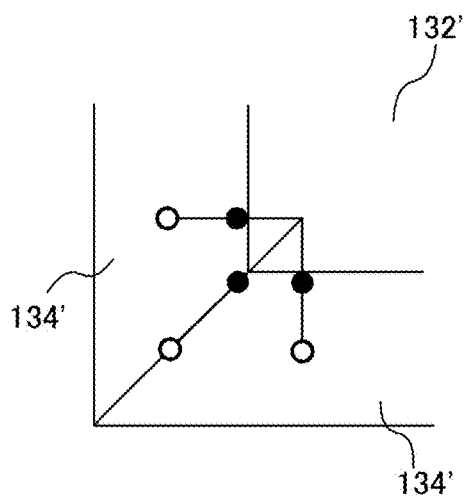
FIG. 10A to FIG. 10C illustrate reflection positions of light on a tilted surface and arrival positions of light on a light reflection member in the case where the reflection member according to the comparative example is used.
Figure 10B:
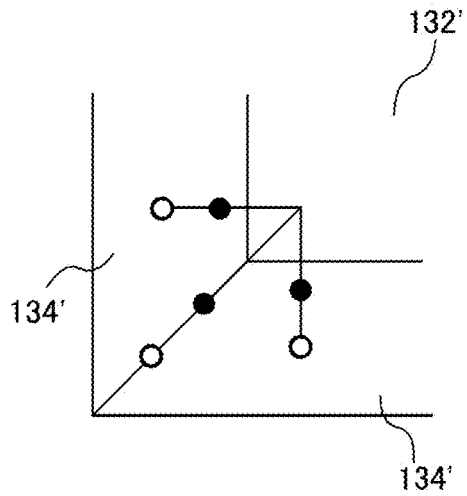
Figure 10C:
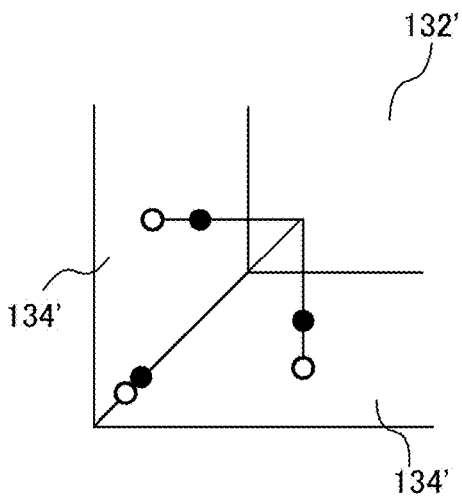
Figure 11A:
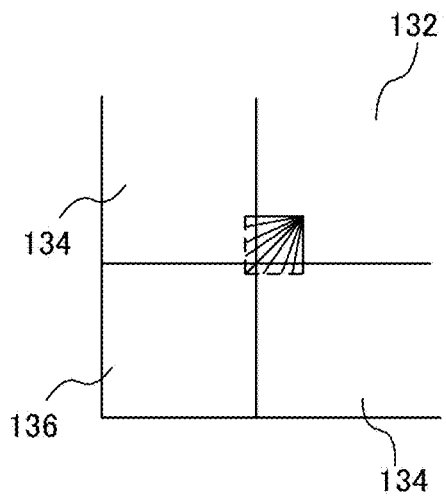
FIG. 11A to FIG. 11D illustrate light paths at a corner portion of the reflection member according to the present embodiment.
Figure 11B:
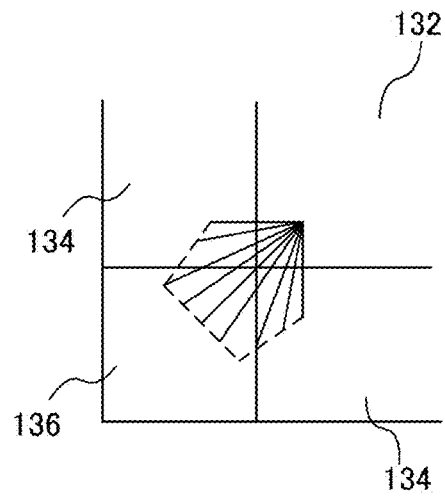
Figure 11C:
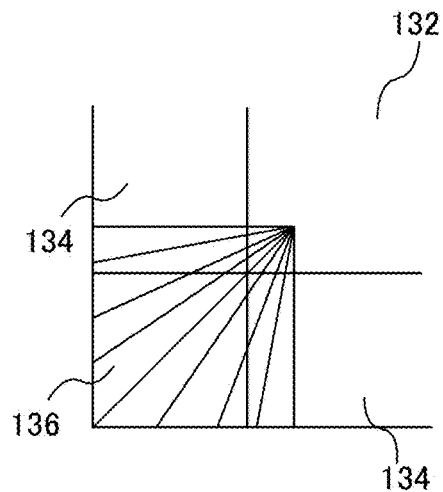
Figure 11D:
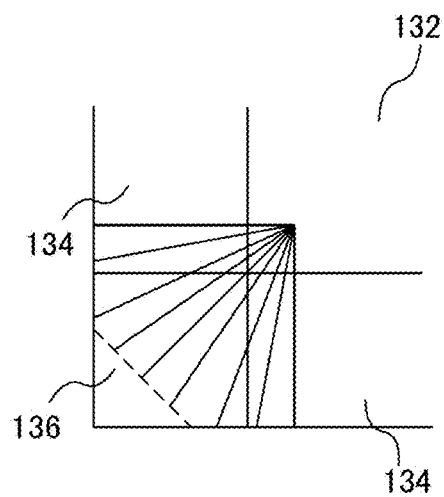
Figure 12A:
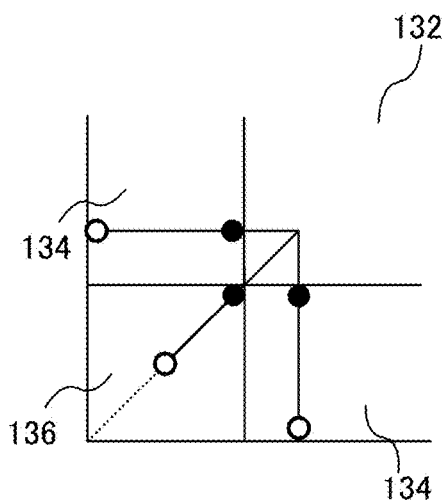
FIG. 12A to FIG. 12C illustrate reflection positions of light on the tilted surface and arrival positions of light on the light reflection member in the case where the reflection member according to the present embodiment is used.
Figure 12B:
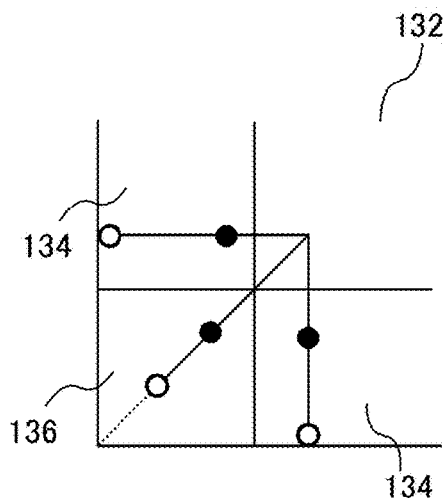
Figure 12C:
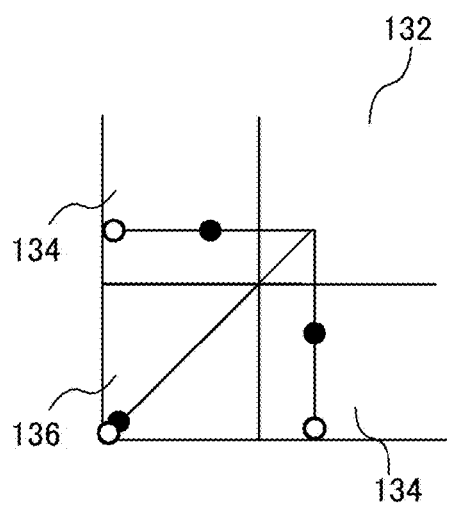

FIG. 8 is a perspective view of reflection member 130' of the comparative example. FIG. 9A to FIG. 9D illustrate light paths of light which is emitted from light emitting element 152 and applied to a corner portion of reflection member 130' of the comparative example. FIG. 9A illustrates light paths of light having an emission angle of 90° (light emitted parallel to bottom surface 132'), FIG. 9B illustrates light paths of light having an emission angle of 86°, FIG. 9C illustrates light paths of light having an emission angle of 82°, and FIG. 9D illustrates light paths of light having an emission angle of 80°. FIG. 10A to FIG. 10D illustrate reflection positions on the tilted surface and arrival positions on light diffusion member 160 in the case where reflection member 130' of the comparative example is used. FIG. 10A corresponds to light having an emission angle of 90°, FIG. 10B corresponds to light having an emission angle of 86°, and FIG. 10C corresponds to light having an emission angle of 82°. FIG. 11A to FIG. 11D illustrate light paths of light which is emitted from light emitting element 152 and is applied to a corner portion of reflection member 130 according to the present embodiment. FIG. 11A illustrates light paths of light having an emission angle of 90°, FIG. 11B illustrates light paths of light having an emission angle of 86°, FIG. 11C illustrates light paths of light having an emission angle of 82°, and FIG. 11D illustrates light paths of light having an emission angle of 80°. FIG. 12A to FIG. 12C illustrate reflection positions on the tilted surface and arrival positions on light diffusion member 160 in the case where reflection member 130 according to the present embodiment is used. FIG. 12A corresponds to light having an emission angle of 90°, FIG. 12B corresponds to light having an emission angle of 86°, and FIG. 12C corresponds to light having an emission angle of 82°. It is to be noted that, in FIG. 9A to FIG. 9D and FIG. 11A to FIG. 11D, the broken lines indicate regions where light emitted from light emitting element 152 arrives. In addition, in FIG. 10A to FIG. 10C and FIG. 12A to FIG. 12C, the black circle symbols indicate arrival positions on reflection members 130 and 130', and white circle symbols indicate arrival positions on light diffusion member 160.

As illustrated in FIG. 9A to FIG. 10C, it was confirmed that, in reflection member 130' of the comparative example, the amount of light reached the corner portion of reflection member 130 corresponding to the corner portion of light diffusion member 160 is not large. On the other hand, as illustrated in FIG. 11A to FIG. 12C, it was confirmed that, in reflection member 130 according to the present embodiment, the amount of light reached the corner portion of reflection member 130 corresponding to the corner portion of light diffusion member 160 is large in comparison with reflection member 130' of the comparative example. In addition, it was confirmed that the most part of light reflected by the corner portion of reflection member 130 reaches the corner portion of light diffusion member 160.

(Simulation of Luminance Distribution of Surface Light Source Device)

The luminance distribution of surface light source device 100 using reflection member 130 according to the present embodiment was simulated. It is to be noted that, for comparison, the luminance distribution of a surface light source device using reflection member 130' of the comparative example provided with no tilted corner surface (see FIG. 8) was also simulated.

Figure 13A:
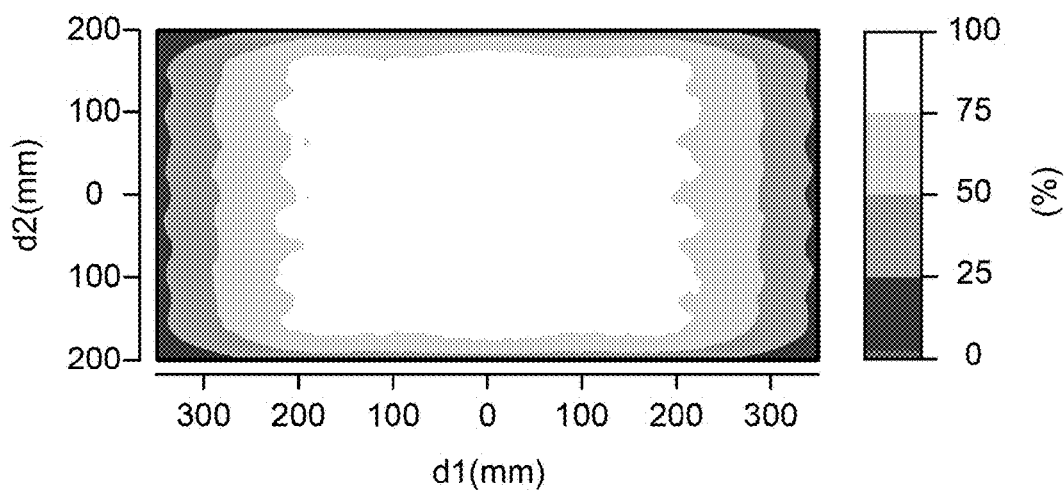
FIG. 13A and FIG. 13B show results of a simulation of a luminance distribution in the surface light source device.
Figure 13B:
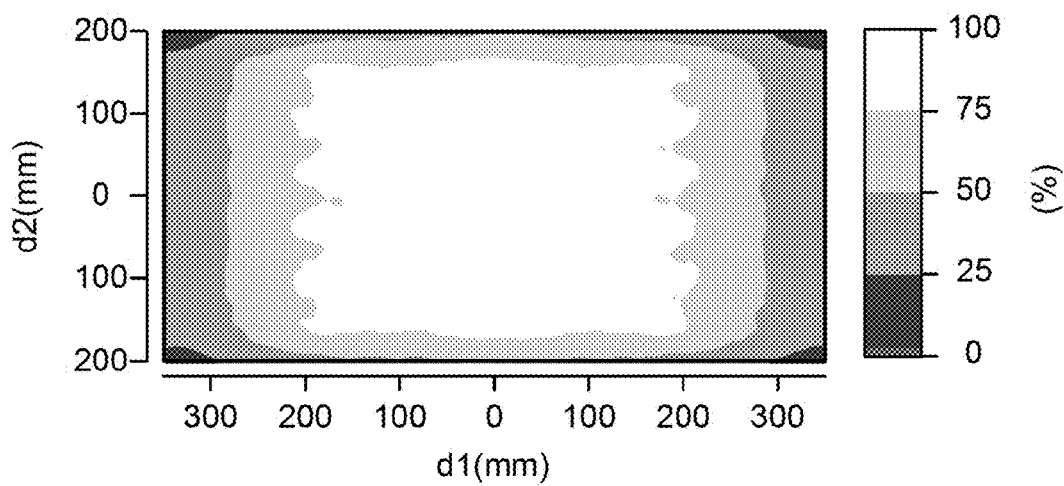

FIG. 13A and FIG. 13B show simulation results of the luminance distributions of the surface light source devices. FIG. 13A shows a simulation result of a luminance distribution of the surface light source device using reflection member 130' according to the comparative example, and FIG. 13B shows a simulation result of a luminance distribution of the surface light source device using reflection member 130 according to the embodiment. The ordinate (d2) and the abscissa (d1) in the left diagrams of FIG. 13A and FIG. 13B indicate distances (mm) from the center light diffusion member 160 (illumination region). In addition, the ordinate in the right diagrams indicates a luminance ratio (%).

As illustrated in FIG. 13A, it was confirmed that, in the surface light source device using reflection member 130' according to the comparative example provided with no tilted corner surface 136, the amount of light emitted from light emitting element 152 and reached the corner portion of the illumination region was not large, and a dark point was caused. On the other hand, as illustrated in FIG. 13B, it was confirmed that, in surface light source device 100 using reflection member 130 according to the embodiment provided with tilted corner surface 136, light emitted from light emitting element 152 reached the corner portion of the illumination region, and the entirety of the illumination region was uniformly illuminated in comparison with the surface light source device according to the comparative example.

(Effect)

As described above, in surface light source device 100 provided with reflection member 130 according to the present embodiment, tilted corner surface 136 is provided, and accordingly a part of light emitted from light emitting element 152 is reflected by tilted corner surface 136 before reaching the corner portion of light diffusion member 160. On the other hand, another part of light emitted from light emitting element 130 directly reaches a center portion of light diffusion member 160 of emitting element 152. Further, another part of light emitted from light emitting element 152 is reflected by tilted surface 134 before reaching a part around light diffusion member 160. Thus, surface light source device 100 according to the present embodiment can uniformly illuminate light diffusion member 160 (illumination region).

In addition, surface light source device 100 according to the present embodiment can be readily manufactured at a low cost since a plurality of light emitting elements 152 and a plurality of light flux controlling members 154 have the same shape.

It is to be noted that, in surface light source device 100, substrate 120 may be disposed on the upper side of reflection member 130. In this case, preferably, substrate 120 is formed such that reflection member 130 is exposed as much as possible. For example, a plurality of light emitting devices 150 may be arranged in a line on substrate 120 which is cut out in a slender form. When slender substrate 120 is used in the above-mentioned manner, the bottom surface of reflection member 130 can be exposed from a part between substrates 120.

This application is entitled to and claims the benefit of Japanese Patent Application No. 2014-231740 filed on Nov. 14, 2014, and Japanese Patent Application No. 2014-239713 filed on Nov. 27, 2014, the disclosure each of which including the specification, drawings and abstract is incorporated herein by reference in its entirety.

INDUSTRIAL APPLICABILITY

The surface light source device of the embodiment of the present invention is suitable for a backlight of a liquid crystal display, a surface illumination apparatus and the like, for example.

REFERENCE SIGNS LIST

10 Surface light source device
12 LED
14 LED substrate
16 Reflection sheet
100 Surface light source device
110 Housing
120 Substrate
130, 130' Reflection member
132, 132' Bottom surface
134, 134' Tilted surface
136 Tilted corner surface
138 Bonding surface
139 Through hole
150 Light emitting device
152 Light emitting element
154 Light flux controlling member
160 Light diffusion member

The invention claimed is:

1. A surface light source device comprising:
a reflection member including:
    a rectangular bottom surface;
    four tilted surfaces connected with four sides of the bottom surface and tilted to the bottom surface such that the four tilted surfaces are raised from the bottom surface; and
    four quadrangular tilted corner surfaces, each of the four quadrangular tilted corner surfaces having a planar shape and being disposed to connect adjacent two tilted surfaces of the four tilted surfaces;
a plurality of light emitting elements disposed above a plane including the bottom surface of the reflection member;
a plurality of light flux controlling members respectively disposed over the plurality of light emitting elements, and configured to control a distribution of light emitted from the plurality of light emitting elements; and
a light diffusion member disposed with an air layer interposed between the plurality of light flux controlling members and the light diffusion member, the light diffusion member being configured to allow light emitted from the plurality of light flux controlling members to pass therethrough while diffusing the light,
wherein the four tilted corner surfaces are each disposed at a separate corner of the bottom surface such that each of four vertices of the bottom surface is connected with one vertex of one of the four tilted corner surfaces, wherein the plurality of light emitting elements and the plurality of light flux controlling members are surrounded by the four tilted surfaces and the four tilted corner surfaces, wherein a height of an upper end portion of the reflection member from the bottom surface is higher than a height of an upper end portion of the light flux controlling member, and wherein, in a side view, a distance between the bottom surface and an upper end of each of the four tilted corner surfaces is greater than a distance between the bottom surface and an upper end of each of the four tilted surfaces.

2. The surface light source device according to claim 1, wherein, in plan view, the four tilted corner surfaces are disposed to fill a region surrounded by adjacent two tilted surfaces of the four tilted surfaces and extensions of external sides of the adjacent two tilted surfaces.

3. The surface light source device according to claim 1, wherein:
   each of the four tilted surfaces is formed in a planar shape, and
   a dihedral angle between the bottom surface and a tilted corner surface of the four tilted corner surfaces is greater than a dihedral angle between the bottom surface and the tilted surface.

4. The surface light source device according to claim 1, wherein the reflection member is composed of a one sheet-like member having a continuous form.

5. The surface light source device according to claim 1, wherein an external shape of each of the four tilted corner surfaces is a rhombus.

\* \* \* \* \*